## (12) United States Patent
Akai

(10) Patent No.: US 12,188,193 B2
(45) Date of Patent: Jan. 7, 2025

(54) METHOD FOR PREVENTING REPEATED (TSUNAMI, STORM SURGE, AND RIVER) DISASTERS BY FORCES OF NATURE

(71) Applicant: Kazuaki Akai, Wakayama (JP)

(72) Inventor: Kazuaki Akai, Wakayama (JP)

( * ) Notice: Subject to any disclaimer, the term of this patent is extended or adjusted under 35 U.S.C. 154(b) by 138 days.

(21) Appl. No.: 17/790,945

(22) PCT Filed: Jan. 7, 2020

(86) PCT No.: PCT/JP2020/000122
§ 371 (c)(1),
(2) Date: Jul. 5, 2022

(87) PCT Pub. No.: WO2021/140559
PCT Pub. Date: Jul. 15, 2021

(65) Prior Publication Data
US 2023/0030676 A1 Feb. 2, 2023

(51) Int. Cl.
*E02B 3/00* (2006.01)
*E02B 3/02* (2006.01)

(52) U.S. Cl.
CPC ..................... *E02B 3/02* (2013.01)

(58) Field of Classification Search
CPC ............ E02B 3/02; E02B 3/023; Y02A 10/00
See application file for complete search history.

(56) References Cited

U.S. PATENT DOCUMENTS

| | | | | | |
|---|---|---|---|---|---|
| RE2,796 | E | * | 11/1867 | Voorhis | 405/217 |
| 1,407,866 | A | * | 2/1922 | Jones | E02B 3/125 |
| | | | | | 405/19 |
| 3,638,432 | A | * | 2/1972 | Schoonmaker | E02B 3/023 |
| | | | | | 37/335 |
| 3,720,067 | A | * | 3/1973 | Aubert | E02B 3/06 |
| | | | | | 405/107 |
| 3,916,832 | A | * | 11/1975 | Sweeney | A01K 61/10 |
| | | | | | 119/212 |

(Continued)

FOREIGN PATENT DOCUMENTS

| | | |
|---|---|---|
| JP | 1988200892 | 2/1988 |
| JP | 1988308106 | 12/1988 |

(Continued)

*Primary Examiner* — Edwin J Toledo-Duran
(74) *Attorney, Agent, or Firm* — Leonid Kisselev

(57) ABSTRACT

Provided is a technique for preventing repeated river, storm surge, and tsunami disasters. "Sea hollow (UTSURO)" is constructed at an estuary, violent tide is generated in an estuary basin water area of a river, ebb and flow energy is caused to exceed flow energy due to gravity in a downstream part of the estuary flow area conventionally dominated by the flow energy due to gravity, the flow energy in the river is thus redistributed to deeply dig the riverbed, enhance flood discharge ability, and prevent repeated river disasters, a levee body of the "sea hollow (UTSURO)" is shared, tsunami or storm surge is reflected in a coastal sea area and is prevented in the sea area, tsunami or storm surge invading the estuary, or estuary flood is caused to overflow into an upstream migration water path constituting the "sea hollow (UTSURO)", and peak cut thereof is performed.

5 Claims, 8 Drawing Sheets

(56) References Cited

U.S. PATENT DOCUMENTS

| | | | | |
|---|---|---|---|---|
| 4,464,080 A | * | 8/1984 | Gorlov | F03B 13/268 |
| | | | | 60/407 |
| 4,824,284 A | * | 4/1989 | Akai | E02B 15/00 |
| | | | | 405/15 |
| 5,228,800 A | * | 7/1993 | Akai | E02B 3/06 |
| | | | | 405/21 |
| 5,636,939 A | * | 6/1997 | Brown | E02B 3/06 |
| | | | | 405/15 |
| 7,214,005 B1 | * | 5/2007 | Davis | E02B 3/108 |
| | | | | 405/15 |
| 2008/0006567 A1 | | 1/2008 | Akai | |
| 2012/0269577 A1 | * | 10/2012 | Christensen | E02B 3/10 |
| | | | | 405/115 |
| 2016/0017558 A1 | * | 1/2016 | French, Sr. | G01N 27/028 |
| | | | | 405/81 |
| 2016/0130776 A1 | * | 5/2016 | Pierce, Jr. | E02B 3/08 |
| | | | | 405/74 |
| 2017/0058473 A1 | * | 3/2017 | Anh | E02B 3/06 |

FOREIGN PATENT DOCUMENTS

| | | | | |
|---|---|---|---|---|
| JP | 2002088750 | | 9/2000 | |
| JP | 2006205000 | | 1/2005 | |
| WO | WO1984001591 | | 4/1984 | |
| WO | WO2004090235 | | 10/2004 | |
| WO | WO-2004090235 A1 | * | 10/2004 | E02B 3/02 |
| WO | WO2008068872 | | 6/2008 | |
| WO | WO2016013109 | | 1/2016 | |

* cited by examiner

METHOD FOR PREVENTING REPEATED (TSUNAMI, STORM SURGE, AND RIVER) DISASTERS BY FORCES OF NATURE

CROSS-REFERENCE TO RELATED APPLICATIONS

This patent application is the U.S. National Phase patent application under 35 U.S.C. § 371, which claims priority to International Application No. PCT/JP2020/000122, filed on Jan. 7, 2020, the disclosure of which is incorporated by reference herein.

TECHNICAL FIELD

The invention of the present application relates to a method for preventing repeated (tsunami, storm surge, and river) disasters by forces of nature.

BACKGROUND

According to a conventional method for preventing tsunami, storm surge, and river disasters, high levees are constructed at both sides of a river or at an inland coastal area to prevent disasters such as river floods, tsunami, and storm surge.

(Rivers)

Rivers are originally water areas dominated by flow energy due to gravity, sediments flowing from the upstream are deposited at estuary sea areas, extension lengths of the rivers extend for long periods of time, riverbed slopes become slow, and riverbed tractive forces are degraded. Construction of levees at such river water areas leads to water level rise in river channels, yet slower river slopes, deposition of sediments in river channels, reduced flood discharge sections, and repeated overflows, which is a primary cause of current river disasters.

In such circumstances, Japanese Patent No. 2726817, "Tide generation apparatus using "sea hollow (UTSURO)"" in 1987 (Showa 62) and Japanese Patent No. 3823998, "Water control and utilization system using tide generation apparatus based on 'hollow sea (UTSURO)'" in 2003 (Heisei 15) were invented to propose estuary problems, but these were not able to sufficiently address measures for water control in river upstream parts.

Therefore, repeated (tsunami, storm surge, and river) disasters are to be prevented by utilizing "Fishway apparatus using contact oxidation levees (Japanese Patent No. 3534061) invented on Sep. 19, 2000 to meet the purpose.

(Tsunami) (Storm Surge)

Although tsunami and storm surge have been prevented by constructing high levees in coastal land areas for protection from tsunami and storm surge, land problems and accompanying big problems in terms of relocation, further life and city convenience, and land water utilization.

(Upstream Migration Tsunami of River)

Riverbed longitudinal slopes of rivers toward sea areas are slow, tsunami waves are broken and migrate to the upstream, and bring about enormous damage along the rivers.

SUMMARY

Technical Problem (Rivers)

Repeated (tsunami, storm surge, river) disasters are to be prevented by effectively utilizing natural energy (flood, storm surge, tsunami, and the like).

Originally, sediments flowing from the upstream are deposited at estuaries of rivers, extension lengths of the rivers extend for long periods of time, riverbed slopes become slow, and river tractive forces are degraded. Construction of levees on both sides of such a river leads to a rise of river channel water level, yet slower energy slope of the river, deposition of sediments in the river channel, reduction of a flood discharge section, and repetition of flooding, which is a primary cause of current river disasters.

Thus, how a huge amount of sediments naturally deposited in a river channel are to be safely excavated, transported, and disposed is an important problem.

Moreover, how to secure a flood discharge section of a river is an important problem of the invention of the present application in order to prevent repeated river disasters.

(Tsunami, Storm Surge)

Furthermore, tsunami waves are waves that are likely to be reflected. Tsunami and storm forge are to be prevented in a coastal sea area instead of preventing them with breakwaters in a land area.

(Prevention of Upstream Migration Tsunami of River)

Since riverbed longitudinal slopes of rivers are slowly inclined toward the sea, tsunami waves invading rivers are broken, migrate to the upstream of the rivers, and bring about enormous damage along the rivers.

Solution to Problem (Prevention of River Disasters)

In order to prevent repeated river disasters, an energy slope of a river is to be enhanced, a riverbed is to be deeply dug, flood discharge ability is to be enhanced, and repeated river disasters are thus to be prevented by generating violent tide in an estuarine basin area at an estuary, causing energy of ebb and flow to exceed the flow energy due to gravity in a downstream part of an estuary flow area dominated by the conventional flow energy due to gravity, and converting the flow energy in the river dominated by the conventional flow energy due to gravity in an upstream part.

A huge amount of sediments deposited on riverbeds are to be safely removed by a natural force by converting the flow energy in the river, the riverbed is to be further deeply dug, flood discharge ability is to be enhanced, and a huge amount of scoured sediments are to be safely removed and further effectively utilized.

A sediment tractive force in a river is represented by Equation 1.

$$\tau = \gamma R I \qquad \text{Equation 1}$$

where ($\tau$; tractive force, $\gamma$; specific gravity of water, R; hydraulic radius (water channel shape), I; water surface slope, energy slope) Therefore, in order to enhance the river tractive force $\tau$, it is necessary to increase the water surface slope (I), to narrow the water channel (path) to deepen the hydraulic radius (R), and thereby to enhance the river tractive force.

Furthermore, regardless of how violent tide is, all tidal flows are flows below seawater surface, there are no tidal flows flowing in land areas, and there are no floods in tidal rivers comparable to the flow amount of flood.

According to this technique, a surrounded water area obtained by surrounding and closing a water area with a change in tide level with a levee body structure is called "sea hollow (UTSURO)", and violent tide is generated in the water channel with ebb and flow by opening the water area with the water channel.

It is possible to generate violent tide at an estuary by extending this water channel entrance toward the upstream of the river. The water channel is called an upstream migration water channel. This technique is Japanese Patent No. 2726817, "Tide generation apparatus using 'sea hollow'" invented in 1987 (Showa 62).

In general, the area A of "sea hollow (UTSRO)" of the tide generation apparatus is represented by Equation (1).

$$Å = Q \times T/H \qquad (1)$$

where, planned flood flow amount of river; Q, semi-long term of ebb and flow; T, tide level difference at planned estuary; H.

(However, in a case in which it is not possible to prepare a sufficient area due to conditions such as terrains or water depths, and the like, the water channel is narrowed to secure the tractive force in accordance with the natural flow amount of the river.)

Also, repeated river disasters are to be prevented in a water area dominated by flow energy due to gravity in an upstream part, by narrowing a water channel, enhancing a tractive force, deeply digging the riverbed, increasing a flood discharge section, and enhancing flood discharge ability.

Additionally, it is possible to utilize the technique of "Fishway apparatus using contact oxidation presentation (Japanese Patent No. 3534061) filed in September, 2000.

The entire ground serves as a super levee if the riverbed is lowered, the flood discharge section is increased, and the flood discharge ability is enhanced by causing ebb and flow energy to exceed flow energy due to gravity in the downstream part of the river flow area dominated by the conventional flow energy due to gravity and redistributing flow energy in the river.

(Protection from Tsunami and Storm Surge)

It is possible to prevent, on the sea, tsunami and storm surge at a coastal area by sharing the levee body of "sea hollow (UTSURO)" in claim 1 as a tide generation apparatus for a river.

Originally, tsunami has long wave lengths, has enormous energy, and causes a huge breaking force when the waves are broken, while tsunami waves are waves with a characteristic that they are likely to be reflected and diffracted.

Therefore, it is possible to prevent tsunami in the sea area by configuring the levee body of "sea hollow (UTSURO)" with a reflection structure and causing reflection.

(Prevention of Upstream Migration Tsunami of River)

In order to prevent damage of upstream migration tsunami and storm surge of a river and a river flood, it is possible to achieve peak-cut of river flood, storm surge, and tsunami by sharing the levee body constituting "sea hollow (UTSURO)" placed in the river estuary coastal area in claim 1 and claim 2, causing rolling-in toward the upstream of the estuary, and setting the crown height of the levee constituting "sea hollow (UTSURO)" to be equal to or less than the seawall height at both sides of the river.

Furthermore, in order to secure the flood release capacity at the estuary and to regulate upstream migration tsunami flowing into the estuary, the width of the opening that tsunami invade is set to a necessary minimum width, and the tsunami and storm surge invasion preventing levees are extended on both sides toward the offing.

In this manner, energy of each of flood, storm surge, and tsunami concentrates on the estuary and contributes to scouring of the estuary at the time of the ebb tide.

Advantageous Effect of Invention

The present invention is a technique for preventing tsunami and storm surge damage including repeated river disasters by converting flow energy in a river by effectively using natural energy as described above.

(Prevention of River Disasters)

Regardless of how violent tide is, all tidal flows are flows below seawater surface, there are no tidal flows flowing in land areas, and there are no floods in tidal rivers comparable to the flow amount of flood.

An effect that the entire ground serves as a natural super levee and river floods are prevented is achieved if the flow energy slope in the river is increased, the riverbed is deeply dug, and the flood discharge section is increased by constituting "sea hollow (UTSURO)" in the estuary sea area, generating violent tide in the estuarine basin at the estuary, and causing energy of ebb and flow to exceed the flow energy due to gravity in the downstream part of the estuary flow area dominated by the conventional flow energy due to gravity in order to prevent repeated river disasters.

Note that narrowing the water channel at the time of high water to enhance the riverbed tractive force, removing a huge amount of sediments naturally deposited, deeply scouring the riverbed, increasing the flood discharge section, and thereby enhancing a water control effect in addition to the above effect in the upstream part dominated by the flow energy due to gravity, and also achieving a transport effect of safely sending the huge amount of sediments scoured in the upstream to the sea area are keys of the system.

Furthermore, it is possible to expect effects of purification of river water quality as a successive purification system of the river and of a fishway at the ordinary time of water shortage, and sometimes, it is possible to expect an effect as a reservoir of the river and further a utilization effect as an inland canal of retaining water in the river channel.

Also, violent tide is generated at the estuary in the estuary water area dominated by ebb and flow energy, a tractive force is enhanced, the river channel is deeply dug, flood discharge ability is enhanced, mud water of floods is safely transported by several hundreds of kilometers, and sometimes several thousands of kilometers to the estuary sea area by a natural force without using transport equipment such as a ship, a train, or an automobile as a transport path of the huge amount of riverbed sediments dredged at the upstream, and it is also possible to expect an environment reservation effect that the mud water is separated into mud and water by a natural force using the sedimentation purification function of "sea hollow (UTSURO)" in the estuary sea area, the mud is used to produce a vast reclaimed land or a tidal flat in a planned manner and is sometimes used with a construction material or a reinforcing material of the levee body of "sea hollow (UTSURO)", and water is cleaned and released to the sea.

It is possible to expect effects that traveling of large-scaled ships is enabled in the river water area and that huge ports are provided along the river, which may lead to active commercial and industrial activities.

Furthermore, it is also possible to expect an inner water drainage effect with the technique of lowering the riverbed and enhancing the river flood discharge ability according to the invention of the present application.

Also, effects of preventing, on the sea, wave surge due to tsunami, storm surge, or typhoons by configuring "sea hollow <UTSURO> in the sea area and of achieving peak-cut of tsunami and storm surge migrating to the upstream at the estuary and further of an estuary flood are achieved.

Note that there is a high scouring effect of discharging a huge amount of sediments deposited at the estuary at the time of low tide after the peak of each of flood, storm surge, or tsunami passes.

Moreover, the water area of "sea hollow <UTSURO>" configured on the sea is a huge quiet water area, and locations of a huge hotel, a leisure facility, an airport, a power plant for solar or wind power generation or power generation based on coals, gas, or atomic power, energy (oil, gas, coals) storage, sewage water, a warehouse, or the like is conceivable as Japanese Patent No. 2662516 "Floating structure using UTSURO in sea area" filed in Showa 61 (1986).

Also, huge ebb and flow power generation using ebb and flow energy is enabled.

Moreover, the huge amount of sediments discharged from the upstream part at the time of a flood are transported to the estuary, the sediments are separated into soil and water, and the sediments are used to reinforce the levee body of "sea hollow <UTSURO>" and to produce a huge land or a tidal flat through embankment due to natural settlement as in the drawing to produce an airport or a city. Sometimes, it is also possible to desalinate "sea hollow <UTSURO>".

BRIEF DESCRIPTION OF THE DRAWINGS

FIG. 2-1 is a sectional view along D-D in FIG. 2.

FIG. 2-2 is a sectional view along E-E in FIG. 2.

FIG. 2-3 is a sectional view along F-F in FIG. 2.

FIG. 2-4 is a diagram illustrating a flood water flow direction during flood in the left diagram and representing a water flow direction at the time of ebb tide during flood in the right diagram.

FIG. 2-5 is a diagram representing a water flow direction at the time of invasion of tsunami or storm surge in the left diagram and representing a water flow direction at the time of ebb tide in the right diagram.

FIG. 3 is a system diagram of riverbed scouring in a water area dominated by flow energy due to gravity at a river upstream part.

FIG. 3-1 is a sectional view along K-K in FIG. 3,

FIG. 3-2 is a sectional view along J-J in FIG. 3.

FIG. 3-3 is a plan view of sequentially performing river-bed scouring from the downstream in FIG. 3.

FIG. 4 is a plan view of a method for generating violent tide using an old river channel in an estuarine basin as an upstream migration channel and it is possible to generate violent tide at an estuary by surrounding and closing an estuary sea area such as a diversion channel or a branch river by 8, and opening it at the upstream of a mainstream river using a water channel as 19.

DETAILED DESCRIPTION (Prevention of River Disasters)

Figure 2:
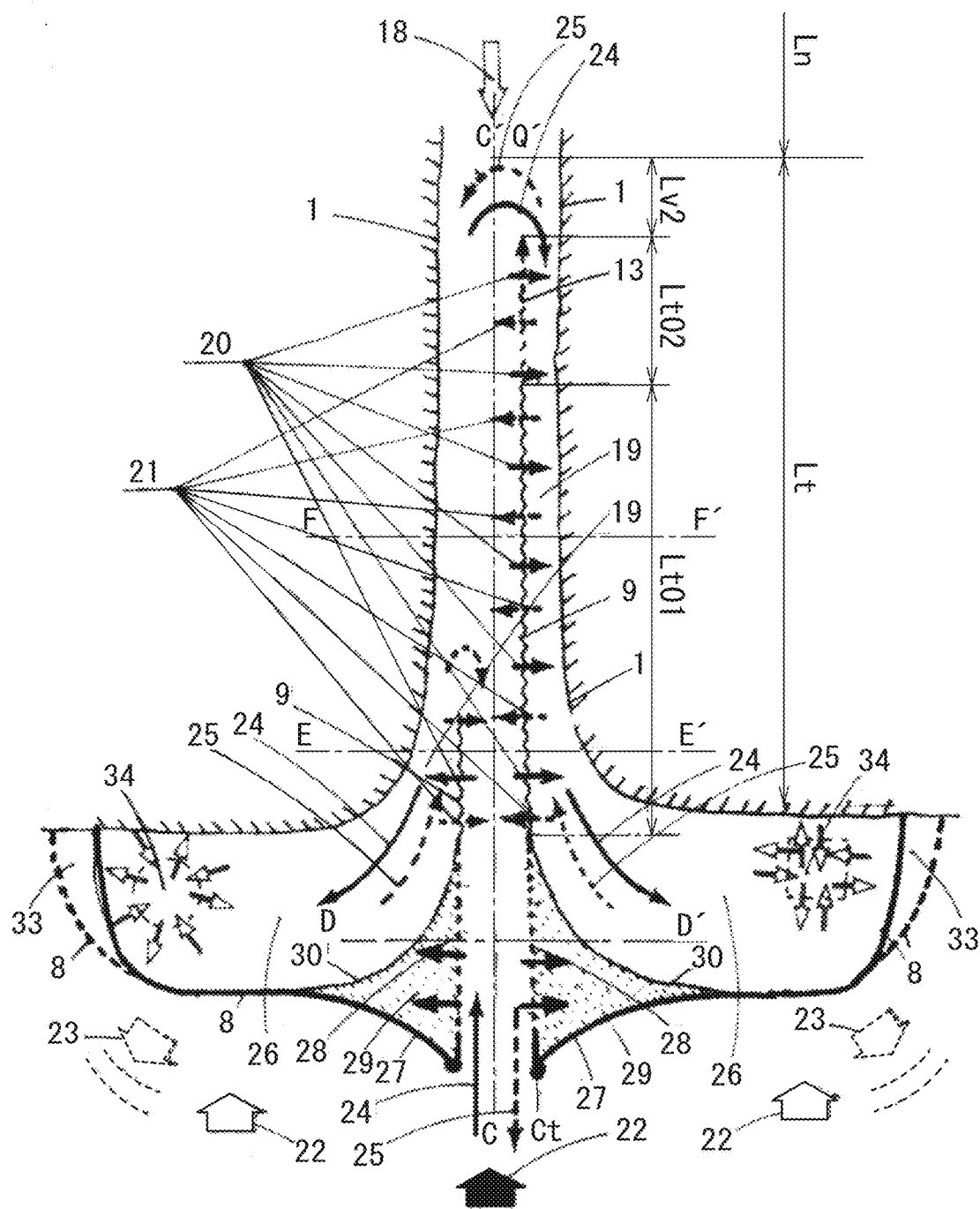
FIG. 2 is a plan view at an estuary of a system that generates violent tide at a river estuary part.
Figures 1, 2:
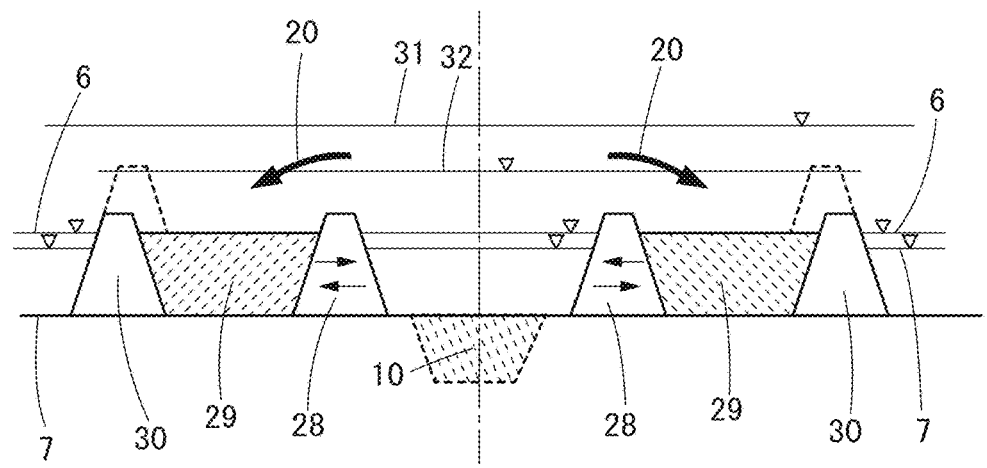
Figure 2:
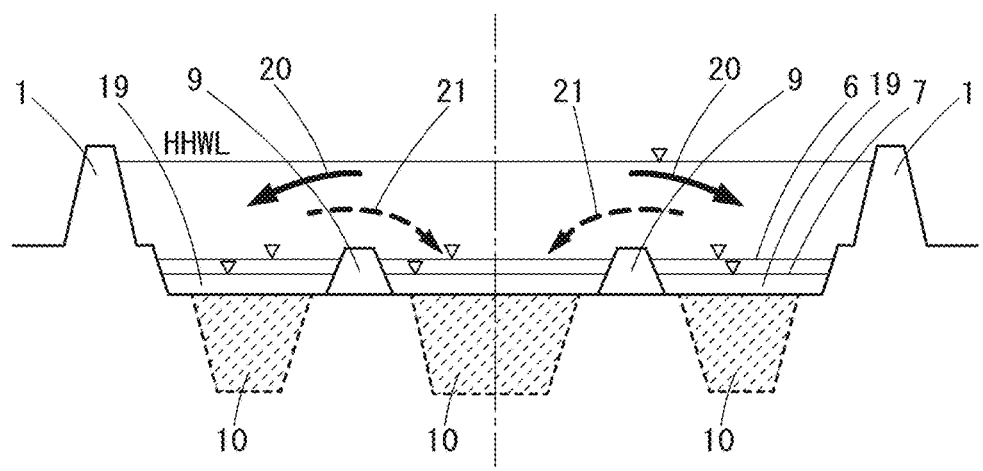

Although an entire water area Lr of a river is originally dominated by flow energy due to gravity in a river flow, it is possible to generate violate tide in an estuarine basin Lt of the river by constructing "sea hollow (UTSURO)" of surrounding an estuary sea area with a levee body structure 8 as illustrated in FIG. 2 and opening a water area 26 inside "sea hollow (UTSURO)" in the estuarine basin water area of the river with an upstream migration water channel 19.

Regardless of how violent tide is, there are no tidal flows that flow in land areas, all the tidal flows are flows below a seawater surface, and there are no floods in tidal rivers comparable to the flow amounts of the rivers.

An estuary water area of a river conventionally dominated by flow energy due to gravity becomes a river water area dominated by ebb and flow energy, and a riverbed in an estuary water area Lt1 of the river is scoured, by increasing the scale of "sea hollow (UTSURO)" and generating tide comparable to the flow amount of the river.

Although the scale of "sea hollow (UTSURO)" depends on Equation (1) above, the water channel is narrowed, and a tractive force is secured in accordance with the natural flow amount of the river in a case in which it is not possible to prepare a sufficient area due to conditions of terrains, water depths, and the like.

Figures 2, 3:
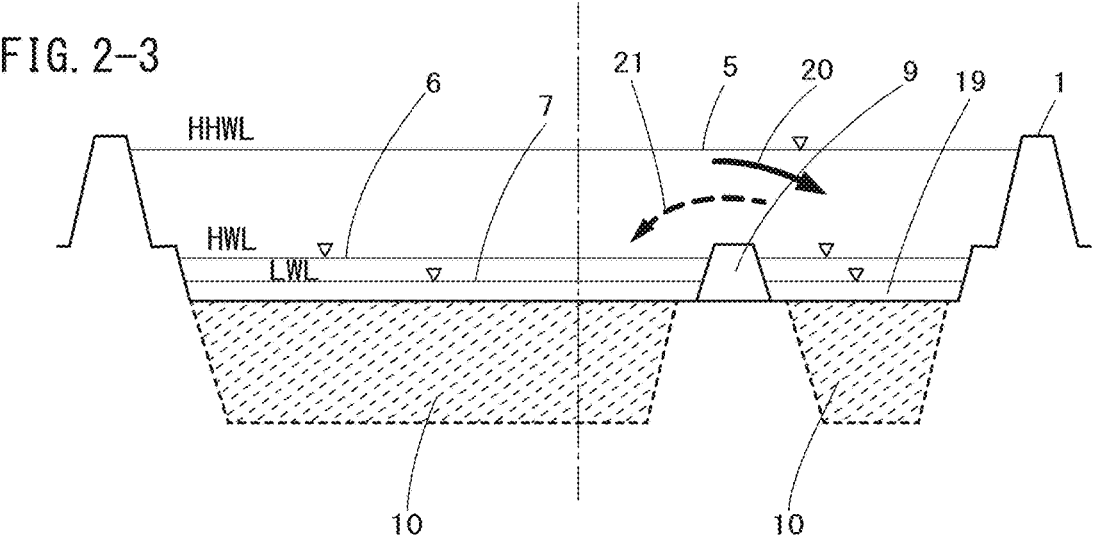
Figures 2, 3, 4:
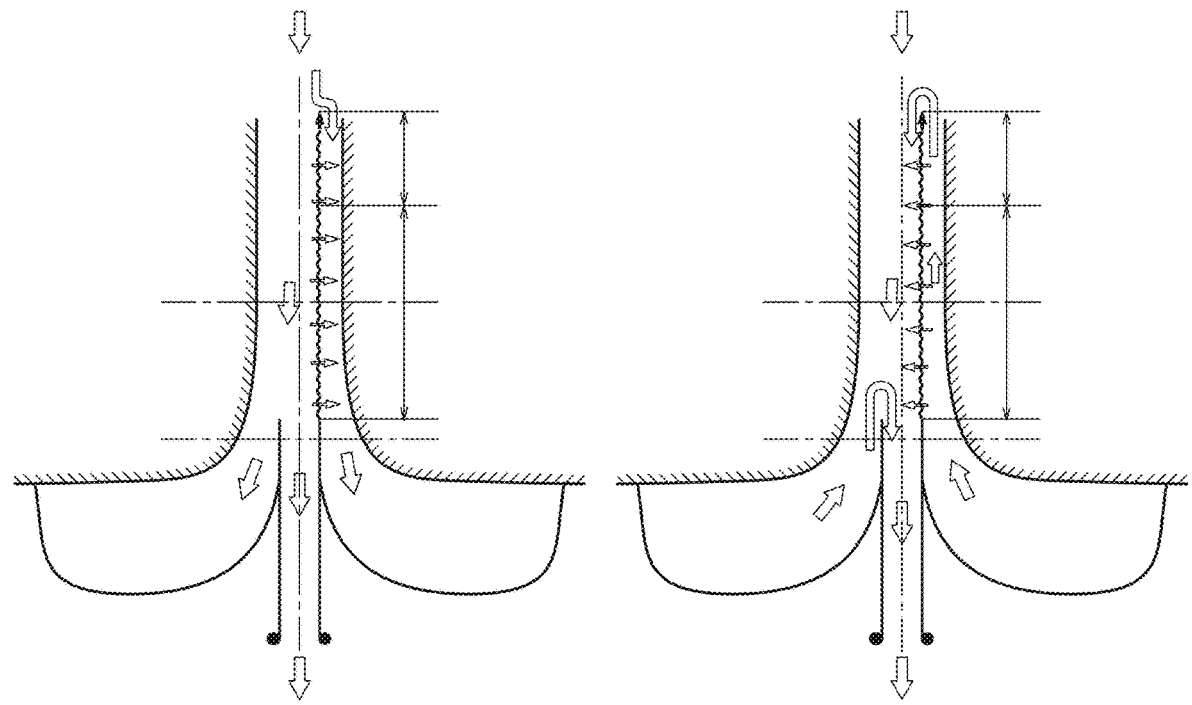
Figures 2, 3, 4, 5:
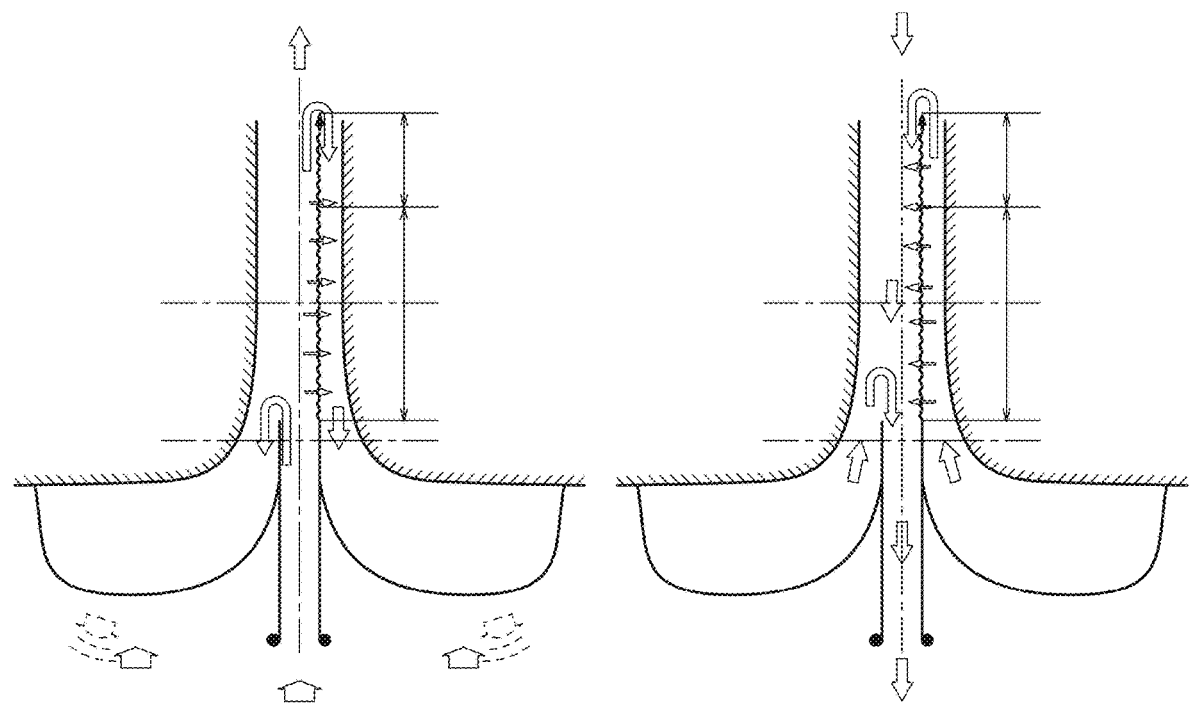
Figure 3:
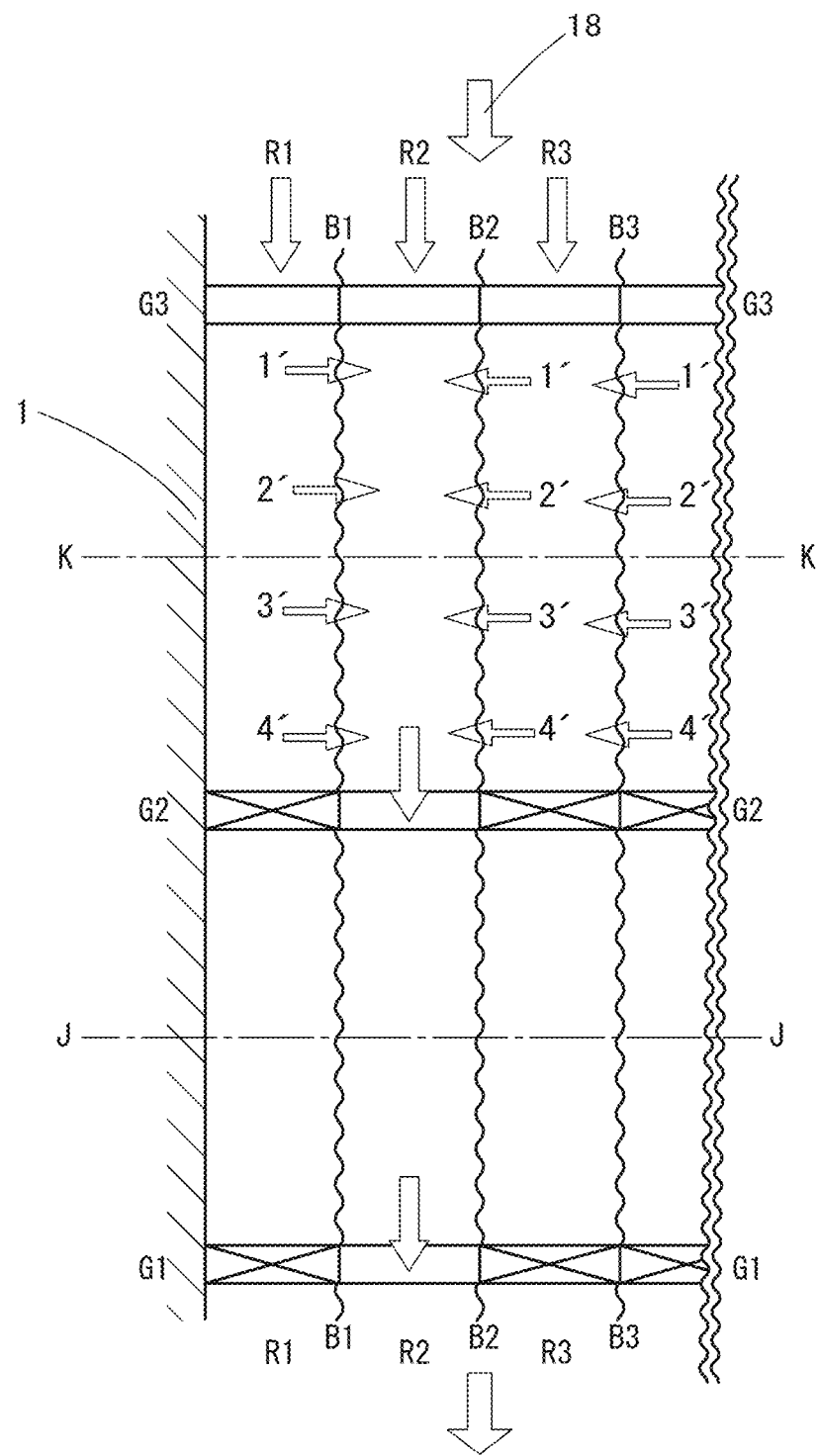
Figures 1, 3:
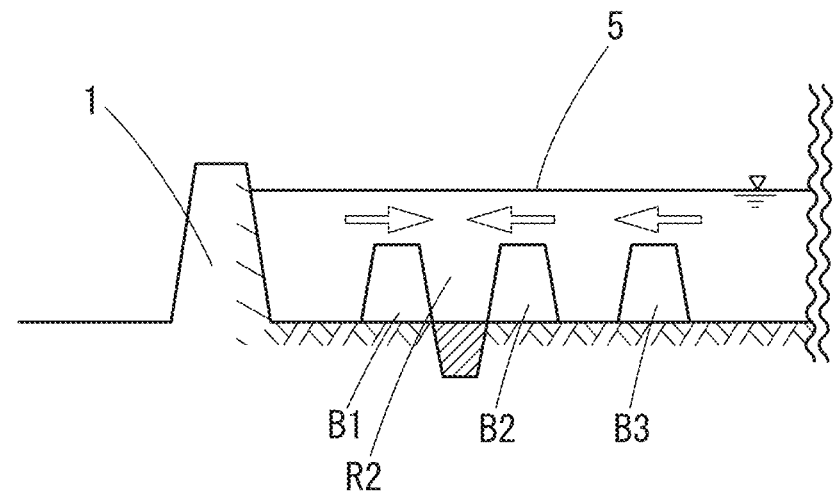
Figures 2, 3:
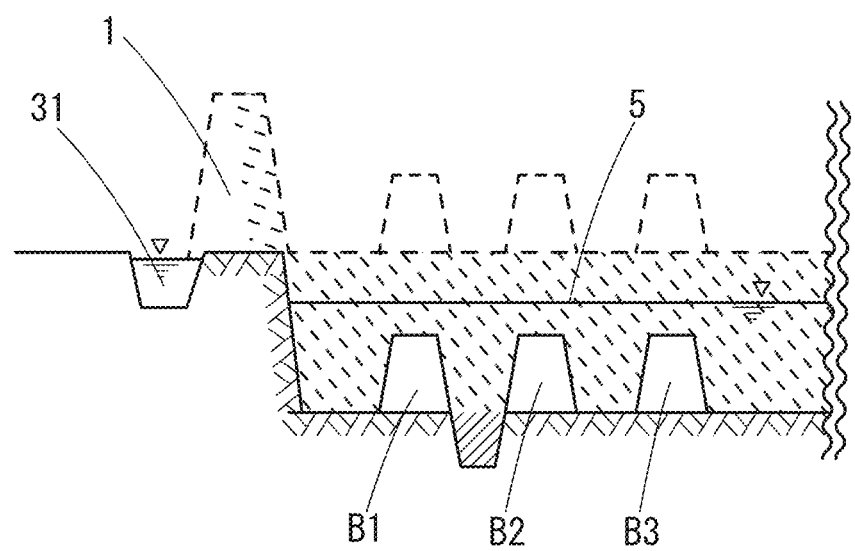
Figure 3:
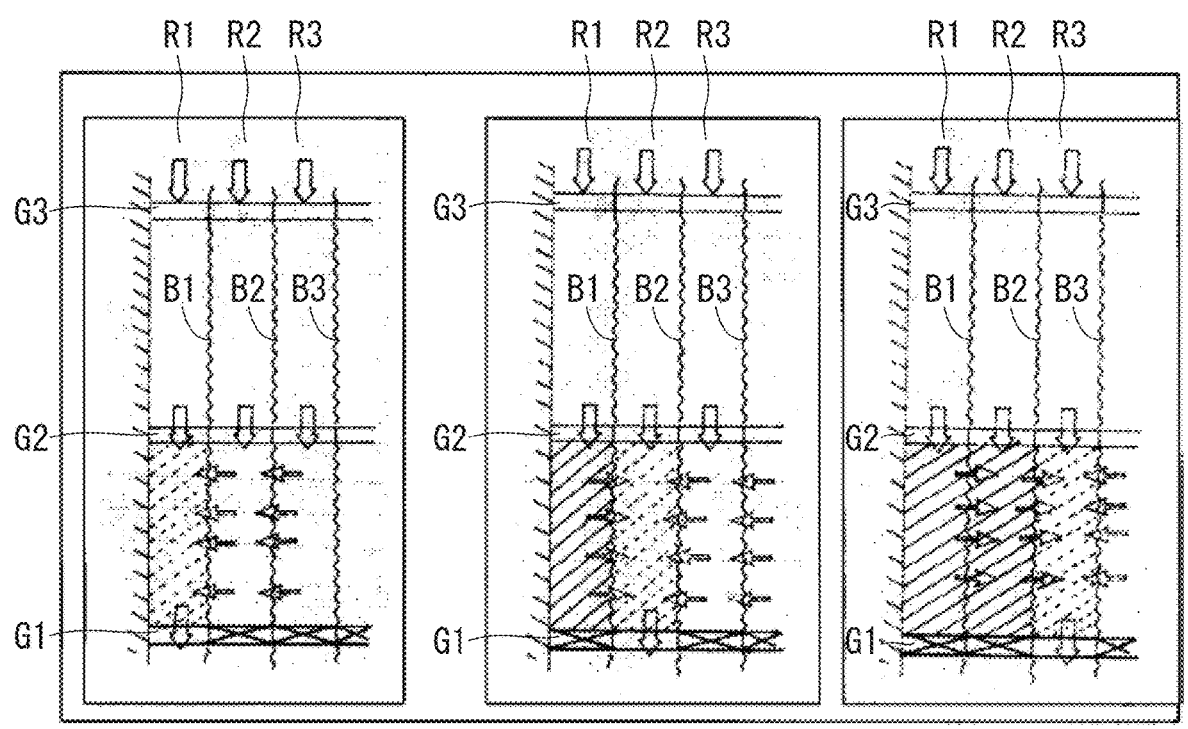
Figure 4:
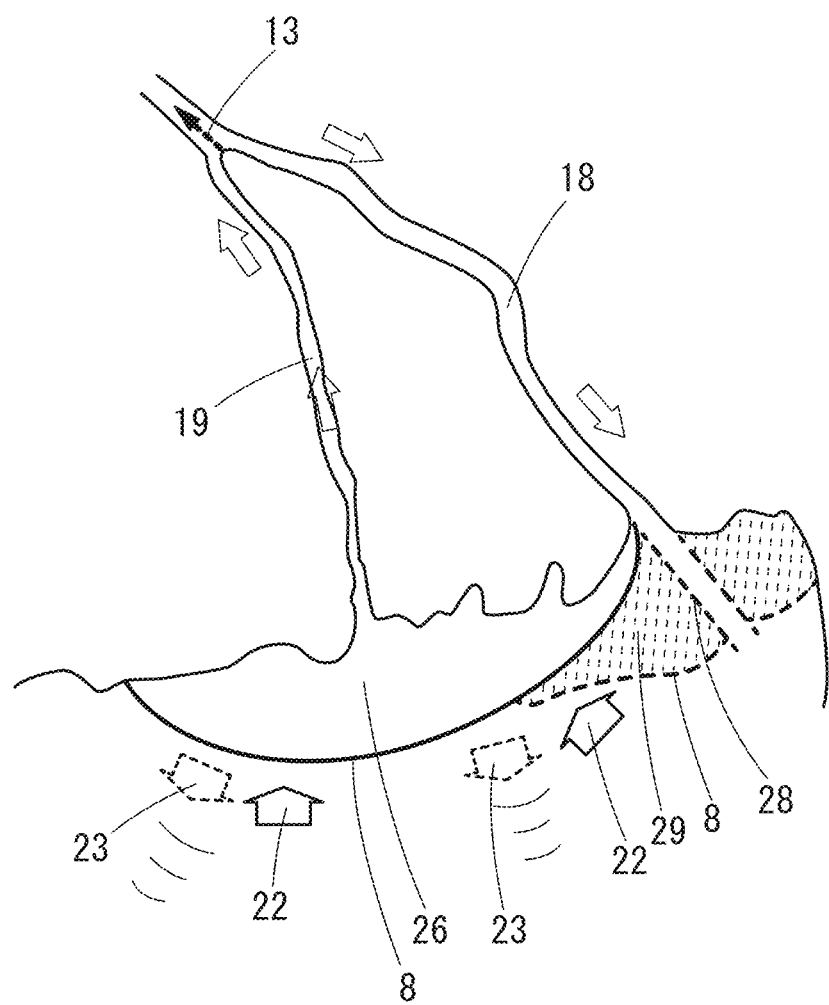

Furthermore, it is possible to generate violent tide in the main stream of the river by surrounding and closing an estuary sea area of an old river channel, a diversion channel, a branch river, or the like in the estuarine basin water area with the levee body structure 8 as in FIG. 5 depending on the terrain, using the diversion channel as an upstream migration water channel 19, and opening it at the upstream of the main stream.

A leading end riverbed is constantly scoured by a violent vortex flow with leading ends Lv1 and Lv2 of the upstream migration water channel entrance 13 used as turnaround points of the water flow.

Figure 1:
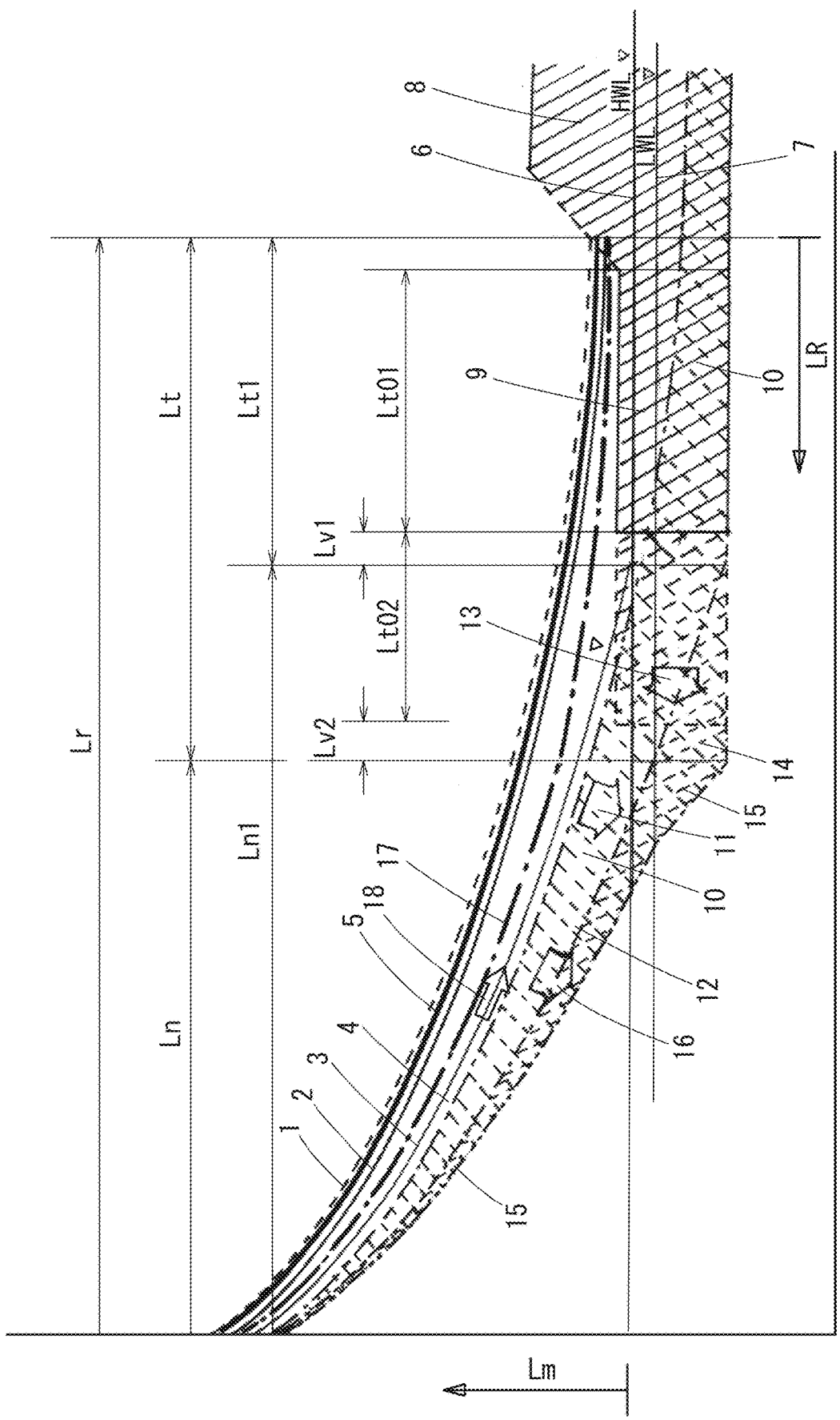
FIG. 1 is a vertical sectional view illustrating energy sections of a river flow.

If it is assumed that the current riverbed 4 of the river is a stable slope, the riverbed is gradually scoured by this technique, and the riverbed is then naturally lowered to the line 12 in FIG. 1.

Further, the riverbed 14 is scoured at the leading end Lv2 by a vortex flow by extending an overflow levee 9 like 13 toward the upstream while holding the tide in the Lv1 section of the upstream migration water channel entrance, the riverbed 14 is further lowered to the line of the riverbed 15 due to the stable slope of the natural flow, and the flood discharge section is further increased.

In this manner, the water area extension Ln dominated by flow energy due to gravity in the upstream part of the river becomes (Ln=Lr−Lt), the extension length of the river dominated by flow energy in the river becomes short, the energy slope in the river is enhanced, riverbed scouring advances, and flood discharge ability is enhanced.

Furthermore, in a case in which the ebb and flow energy is insufficient due to the extension of the system described above, deposition of sediments in the water area 26 inside "sea hollow (UTSURO)", and the like in the future, "sea hollow (UTSURO)" 33 will be enlarged.

Moreover, in order deeply dig the riverbed in the section of the upstream part Ln dominated by flow energy due to gravity and to enhance flood discharge ability, the water channel in upstream and intermediate stream water areas is narrowed, the tractive force is enhanced, the riverbed is lowered, and the flood discharge section in the upstream part of the river is further increased.

According to this technique, separation levees are constructed such that low separation levees B longitudinally continue in a river reservation mainly using the riverbed mud and the like as illustrated in FIG. 3, and in a case of a river with a wide width, a plurality of separation levees like B1, B2, B3, . . . are provided, movable dams G1 and G2 are placed at both upstream and downstream ends, and G3, . . . are further placed toward the upstream, the water channel is narrowed by operations of the upstream and downstream movable dams, the tractive force is enhanced, the riverbed is deeply scoured, and these operations are repeated, such that it is possible to deepen each water channel.

Moreover, water is retained in the water channels on the sides, the levee tops of the separation levees on the sides in the upstream part are lowered to allow overflowing beyond the separation levees, the entire separation levee bodies are scoured together, and the sediments in the river channel are caused to flow out.

These operations are alternately repeated to increase the flood discharge section of the river.

As an example of the above operations, if scouring is performed from the downstream part in FIG. 3-3, and the flood discharge ability is enhanced, then the entire ground serves as a super levee, and repeated river disasters are prevented.

There is a concern of a water level decrease of groundwater or underground water with the lowering of the riverbed described above, and it is essential to place preservation water channels 31 on both sides of the river.

(Protection from Tsunami and Storm Surge)

Although storm surge waves are typically not broken, if tsunami or storm surge waves are caused to break, they release enormous energy, the wave heights increase, and water invasion to land areas occurs, which leads to expansion of damage.

The maximum wave height of offing tsunami waves is about 10 m, and the offing tsunami waves are waves that have long wave lengths and are likely to be diffracted and reflected.

The surrounded coastal land area is to be protected from tsunami and storm surge by sharing the levee body 8 of the tide generation apparatus based on "sea hollow (UTSURO)" described above in claim 1.

Waves are not broken and are reflected as overlapping waves by the front water depth at the breakwater being set to be equal to or greater than about a double the wave height.

Tsunami is reflected by maintaining the front water depth at the levee body 8 constituting "sea hollow (UTSURO)" to be equal to or greater than about a double the wave height of tsunami.

Therefore, a tsunami breakwater with a reflection structure in which the levee bodies of "sea hollow (UTSURO)" placed in the coastal sea area as described in claim 1 are continued is constructed thereby to prevent tsunami and storm surge in the coastal sea area and prevent repeated tsunami and storm surge.

(Measures for Upstream Migration Tsunami and Storm Surge of River and Estuary Flood)

In order to prevent damage due to upstream migration tsunami and storm surge of a river and further an estuary flood, the levee body constituting "sea hollow (UTSURO)" placed in the river estuary coastal sea area as in claim 1 and claim 2 is shared to achieve rolling-in toward the upstream of the estuary, further extension toward the upstream of the river is achieved, and the water channel entrance is opened in the upstream part of the river.

The crown height of the levee body constituting "sea hollow (UTSURO)" is set to be equal to or less than the seawall height on both sides of the river in the river to allow the peak of estuary flood, storm surge, or tsunami to cause overflow, and peak-cut of the estuary flood, storm surge, or tsunami is achieved.

At the time of ebb tide during the flood, storm surge, or tsunami described above, such energy plays an important role in scouring of the estuary and prevent repeated estuary flood, storm surge, and tsunami disasters as illustrated in the right diagram in each of [FIG. 2-4] and [FIG. 2-5].

Furthermore, in order to secure the flood discharge capacity at the estuary and to limit and restrict the upstream migration tsunami flowing into the estuary, the width of the opening into which tsunami and storm surge flows is set to be the bare minimum, and the tsunami and storm surge invasion preventing levees 28 are extended on both sides toward the offing.

(Transport and Processing of Sediments)

The above techniques in claim 1, claim 2, claim 3, claim 4, and claim 5 require excavation and transport of an unimaginably huge amount of sediments.

Such scoured sediments are safely transported as mud water at the time of flood or the like by several tens of kilometers, several hundreds of kilometers, or sometimes several thousands of kilometers to the estuary sea area, by enhancing a river tractive force and effectively utilizing a natural force on the basis of the techniques in claim 1, claim 2, claim 3, claim 4, and claim 5 using a natural force without using transport equipment such as a truck, a ship, or a train, 26 "sea hollow (UTSURO)" B (the water area 29 surrounded by a multiple-gap levee body 28 is a quiet water area), the multiple-gap levee body being a rubble mound levee, a concrete block levee, a slit caisson levee and the like, or a mixed levee thereof. Mud water that has reached the estuary is transmitted through the multiple-gap levee body due to a natural ebb and flow action, enters "sea hollow (UTSURO) B where the sea area 29 is a quiet sea area, mud is settled in six hours of tide and flow, and water is cleaned and flows out to the sea area at the time of ebb tide.

Furthermore, organic substances are subjected to contact oxidation and are further cleaned by microorganisms when entering and exiting the levee body.

Therefore, provided is a method of an environment-friendly technique of preventing repeated river disasters as a system essential for completing the techniques of claim 1, claim 2, claim 3, claim 4, and claim 5 described above.

When the techniques for preventing repeated (tsunami, storm surge, and river) disasters with a natural force as described above are performed, it is always necessary to perform hem from the estuary part in a planned manner.

REFERENCE SIGNS LIST

1 Height of river levee
2 Ground height of riverbed of river in current situation
3 Surface water at normal time
4 Riverbed of river in current situation
5 Maximum flood level
6 High water level of ebb and flow
7 Low water level of ebb and flow
8 Tsunami breakwater
9 Levee body constituting upstream migration channel, overflow levee for peak-cut at time of attack of river upstream migration tsunami, storm surge, and estuary flood
10 Vertical section of estuary riverbed scoured by tide generation apparatus "hollow sea (UTSURO)"
11 Direction of lowering of riverbed of scoured riverbed at estuary due to stable slope of river
12 Scoured riverbed with stable slope of 11
13 Extension direction of levee body constituting upstream migration channel 14 Leading end scouring by vortex flow at turnaround of upstream migration channel entrance
15 Vertical section of riverbed scouring with decrease in stable slope in case of extension toward upstream of levee body constituting upstream migration channel
16 Direction of decrease in stable slope at upstream of river with extension of upstream migration channel
17 HHWL decrease line with enlargement of flood discharge section due to lowering of riverbed accompanying 15 described above
18 Direction of river flow
19 Upstream migration channel
20 Direction of peak-cut due to upstream migration tsunami or storm surge of river or overflow of river flood
21 Returning flow of 20 described above due to change in ebb and flow
22 Direction of tsunami
23 Reflection of tsunami
24 Direction of tsunami or storm surge flow
25 Returning flow of 24 described above
26 Inland water area of "sea hollow (UTSURO)" B
27 Sediment trap outer levee constituting "sea hollow (UTSURO)"
28 Tsunami and storm surge invasion preventing levee
29 Sediment trap of "sea hollow (UTSURO)"
30 Inner levee constituting "sea hollow (UTSURO)"
31 Tsunami wave height
32 Calm water level of tsunami wave
33 Expanded water area of "sea hollow (UTSURO)"
34 Highly purification system using "sea hollow (UTSURO)"

REFERENCE SYMBOLS LIST

LR River extension
Lm Altitude
Lr Entire length of river
Lt01 Extension of overflow levee of initial upstream migration channel
Lv1 Extension of deeply-scoured water area due to returning flow (leading end vortex flow) with placing of upstream migration channel
Lt02 Extension of overflow levee obtained by extending deeply-scoured water area toward upstream
Lv2 Vortex flow length at leading end of overflow levee
Lt Extension of river water area dominated by ebb and flow energy
Ln Extension of water area dominated by flow energy due to gravity
B1, B2, and B3 are levee bodies constructed by collecting mainly riverbed sediments in river reservation and longitudinally successively constructing low separation levees,
G1, G2, and G3 are movable dams placed on left and right sides of upstream and downstream every time longitudinal upward and downward movement by 1 to 5 m occurs.

The invention claimed is:

1. A method for preventing repeated river disasters, comprising:
constructing a levee body surrounding a part of an area with a water level variable due to tide levels to form a surrounded water area;
constructing a water channel connected to the surrounded water area for putting river water and water from a sea in and out of the surrounded water;
area, wherein one end portion of the levee body is connected to one of a riverside of a river or a coast proximate to an estuary and another end portion of the levee body is in the river and forms a water inlet and outlet of the water channel such that water from the river and seawater flow into the surrounded water area from the water inlet and outlet at a time of a high tide level and the river water and the seawater inside the surrounded water area flow out of the water inlet and outlet to the river at the time of a low tide level, thereby scouring sediments at a bed of the river on a downstream side from the water inlet and outlet and enlarging a flood discharge section of the river;
wherein a position of the water inlet and outlet of the channel is changed in a direction of flow of the river by varying a length of the other end portion of the levee body;
constructing with a plurality of separation levees extending in a direction of flow of the river a plurality of sectioned water channels;
further enlarging the flood discharge section of the river, comprising:
placing movable dams on both end portions of each of these sectioned water channels in the river flowing direction, such that an amount of flowing water in each sectioned water channel is able to be changed through an operation of opening or closing each of the movable dams one or more times to scour riverbeds of one more of the sectioned water channels and thus deepen those one or more sectioned water channels, wherein the water is retained on sides of the sectioned water channels; and
lowering one or more times tops of the separation levees on sides that are upstream, which allows overflowing of the separation levees, scouring of the separation levees together and causing the sediments to flow out.

2. The method for preventing repeated river disasters according to claim 1, wherein one or more of the opening and closing of each of movable dams and lowering the tops of the separation levees is performed multiple times.

3. The method for preventing repeated river disasters according to claim 1, wherein a portion of the levee body facing the sea comprises a breakwater, and a seabed in front of the breakwater is formed such that the water depth in an area of the sea in front of the breakwater is equal to or greater than double a height of a wave of a tsunami.

4. The method for preventing repeated river disasters according to claim 3, wherein the surrounded water area is provided on each of both left and right sides of the estuary, and an estuary width of a further estuary formed between breakwaters of the surrounded water areas on both the sides is set to be a minimum width necessary for releasing the river water.

5. The method for preventing repeated river disasters according to claim 1, wherein the levee body comprises a plurality of gaps, a purification water area is surrounded by the levee body, and the levee body's position is connected to the river proximate to the estuary.

* * * * *